(12) United States Patent
Raval et al.

(10) Patent No.: US 7,020,716 B2
(45) Date of Patent: Mar. 28, 2006

(54) METHOD AND SYSTEM FOR VERIFYING THE HARDWARE IMPLEMENTATION OF TCP/IP

(75) Inventors: Jignesh Raval, Santa Clara, CA (US); Purna Mohanty, Santa Clara, CA (US); Anil Kapatkar, San Jose, CA (US); Sivakumar Munnangi, Santa Clara, CA (US)

(73) Assignee: Adaptec, Inc., Milpitas, CA (US)

( * ) Notice: Subject to any disclaimer, the term of this patent is extended or adjusted under 35 U.S.C. 154(b) by 736 days.

(21) Appl. No.: 09/944,716

(22) Filed: Aug. 31, 2001

(65) Prior Publication Data

US 2003/0046418 A1   Mar. 6, 2003

(51) Int. Cl.
| | |
|---|---|
| *G06F 15/153* | (2006.01) |
| *G06F 7/62* | (2006.01) |
| *G06F 9/455* | (2006.01) |
| *G06F 17/50* | (2006.01) |
| *G01R 31/08* | (2006.01) |
| *H04J 1/16* | (2006.01) |
| *H04L 12/26* | (2006.01) |
| *G06F 15/16* | (2006.01) |
| *G06F 13/12* | (2006.01) |
| *G06F 9/44* | (2006.01) |
| *G06F 11/00* | (2006.01) |
| *G08C 15/00* | (2006.01) |
| *H04J 3/14* | (2006.01) |
| *H04L 1/00* | (2006.01) |

(52) U.S. Cl. ............... 709/237; 709/224; 703/16; 703/17; 703/21; 703/23; 712/36; 370/249; 370/250

(58) Field of Classification Search ............... 709/224, 709/230, 237; 703/13–17, 20, 21, 23, 24; 702/69; 713/502; 712/36, 41; 370/236, 370/245, 248–250

See application file for complete search history.

(56) References Cited

U.S. PATENT DOCUMENTS

| | | | | |
|---|---|---|---|---|
| 5,600,579 | A | * | 2/1997 | Steinmetz, Jr. ............... 703/13 |
| 5,881,267 | A | * | 3/1999 | Dearth et al. .................. 703/27 |
| 5,910,897 | A | * | 6/1999 | Dangelo et al. ............... 716/19 |
| 6,134,516 | A | * | 10/2000 | Wang et al. ................... 703/27 |

(Continued)

OTHER PUBLICATIONS

Stevens, W. Richard. "TCP/IP Illustrated, vol. 1: The Protocols," Addison-Wesley, 1994.*

(Continued)

*Primary Examiner*—Jason Cardone
*Assistant Examiner*—Melvin H. Pollack
(74) *Attorney, Agent, or Firm*—IP Strategy Group, PC

(57) ABSTRACT

The present invention provides for a method and system for verifying hardware operation of an Application Specific Integrated Circuit ("ASIC") chip. The ASIC includes microcode logic for enabling Transmission Control Protocol/Internet Protocol ("TCP/IP") processing. The method is performed in a system that includes a first computing device having a processor and computer code for simulating a computing device that includes the ASIC. Wherein the ASIC is tested against a conventional TCP/IP stack included in a second computing device coupled to the first computing device.

8 Claims, 4 Drawing Sheets

U.S. PATENT DOCUMENTS

| | | | | |
|---|---|---|---|---|
| 6,334,207 B1 * | 12/2001 | Joly et al. | ...................... | 716/17 |
| 6,360,353 B1 * | 3/2002 | Pember et al. | ................. | 716/4 |
| 6,389,379 B1 * | 5/2002 | Lin et al. | ....................... | 703/14 |
| 6,438,739 B1 * | 8/2002 | Yamada | ........................ | 716/18 |
| 6,446,121 B1 * | 9/2002 | Shah et al. | .................. | 709/224 |
| 6,457,152 B1 * | 9/2002 | Paley et al. | .................. | 714/738 |
| 6,470,482 B1 * | 10/2002 | Rostoker et al. | ................ | 716/6 |
| 6,473,803 B1 * | 10/2002 | Stern et al. | ................. | 709/238 |
| 6,578,174 B1 * | 6/2003 | Zizzo | ............................ | 716/1 |
| 6,606,588 B1 * | 8/2003 | Schaumont et al. | .......... | 703/15 |
| 6,622,172 B1 * | 9/2003 | Tam | ........................... | 709/232 |
| 6,754,228 B1 * | 6/2004 | Ludwig | ...................... | 370/468 |
| 6,760,769 B1 * | 7/2004 | Jayam et al. | ................ | 709/228 |
| 6,826,717 B1 * | 11/2004 | Draper et al. | ................. | 714/39 |
| 6,832,184 B1 * | 12/2004 | Bleier et al. | .................. | 703/23 |
| 6,834,307 B1 * | 12/2004 | Magnussen et al. | ........ | 709/230 |
| 6,839,884 B1 * | 1/2005 | Narain et al. | ................... | 716/5 |
| 6,907,005 B1 * | 6/2005 | Dahlman et al. | ........... | 370/236 |
| 6,907,042 B1 * | 6/2005 | Oguchi | ....................... | 370/412 |
| 6,907,460 B1 * | 6/2005 | Loguinov et al. | ........... | 709/224 |
| 6,910,148 B1 * | 6/2005 | Ho et al. | ....................... | 714/4 |
| 6,934,255 B1 * | 8/2005 | Toporek et al. | ............. | 370/235 |
| 2002/0038373 A1 * | 3/2002 | Border et al. | ................ | 709/230 |
| 2002/0106991 A1 * | 8/2002 | Foore et al. | ................... | 455/70 |
| 2002/0152060 A1 * | 10/2002 | Tseng | ........................... | 703/17 |
| 2002/0156885 A1 * | 10/2002 | Thakkar | ..................... | 709/224 |
| 2003/0037154 A1 * | 2/2003 | Poggio et al. | .............. | 709/230 |

OTHER PUBLICATIONS

Calvez, J.P. et al. "Functional-level synthesis with VHDL," European Design Automation Conference, 1993, with EURO-VHDL '93. Sep. 20-24, 1993. Pp. 554-559.*

Touba, N. A. "RP-SYN: synthesis of random pattern testable circuits with test point insertion," IEEE Transactions on Computer-Aided Design of Integrated Circuits and Systems, vol. 18, Issue 8, Aug. 1999, Pp. 1202-1213.*

Chen, Y. W. "Study on the Prevention of SYN flooding by using Traffic Policing," Network Operations and Management Symposium, 2000, Apr. 10-14, 2000, Pp. 593-604.*

Parker, S. and Schmechel, C. "Some Testing Tools of TCP Implementors," RFC 2398, Aug. 1998.*

Paxson, V. "Computing TCP's Retransmission Timer," RFC 2988, Nov. 2000.*

Synplicity. "Certify: ASIC Prototypes Synthesized Directly from RTL Code," 2001.*

Mills, Don and Cummings, Clifford E. "RTL Coding Styles that Yield Simulation and Synthesis Mismatches," Synopsis Users Group Conference, Oct. 09, 2000.*

Zhang, Weijun. "VHDL Tutorial: Learn by Example," Jun. 2001.*

\* cited by examiner

| Source Port | Destination Port | | |
|---|---|---|---|
| Sequence Number | | | |
| Acknowledgement Number | | | |
| HLEN | Reserved | Code Bits | Window |
| Checksum (15-0) | | Urgent Pointer | |
| Options (if any) | | | Padding |
| Data | | | |

Fig. 1 Prior Art

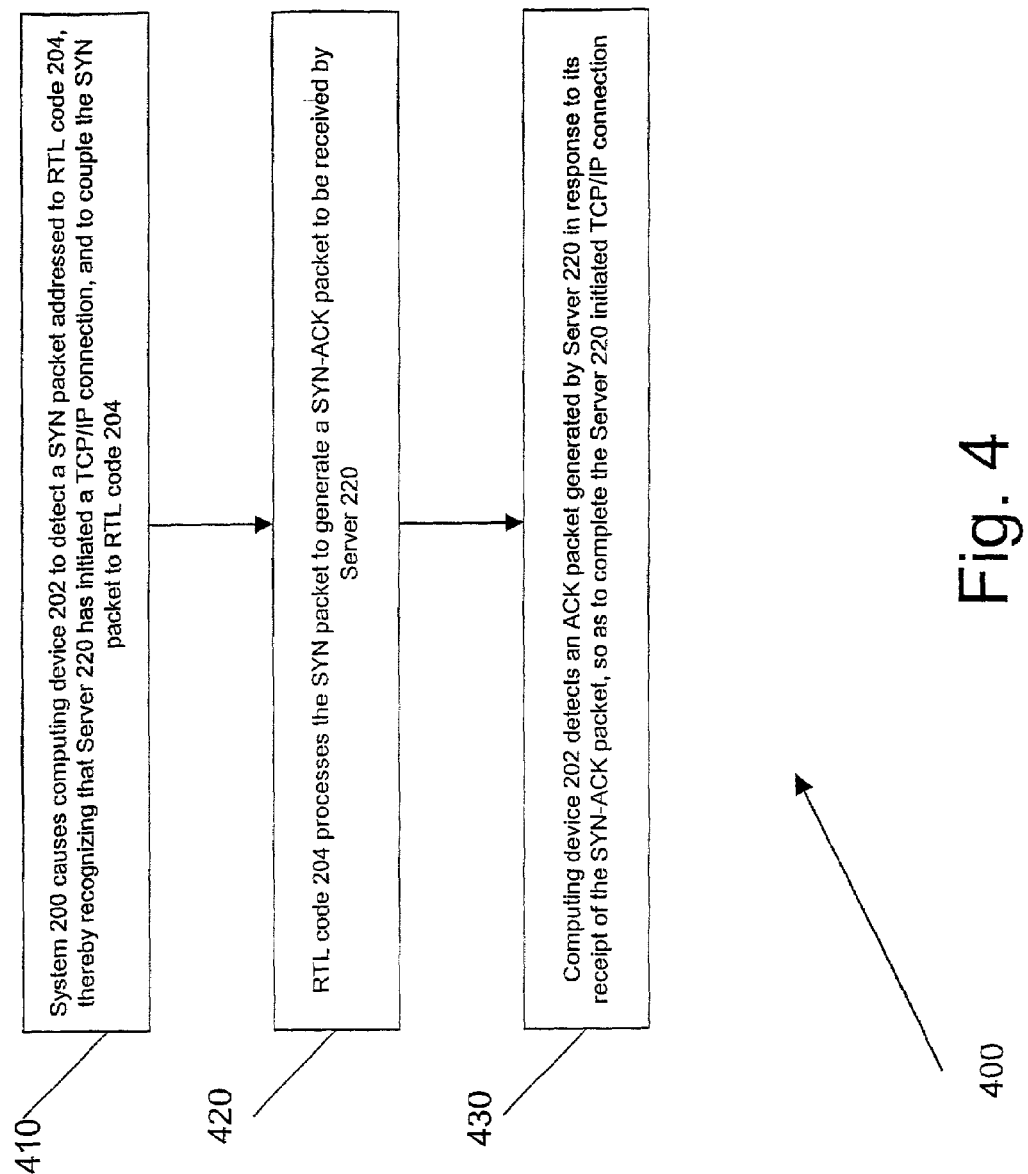

METHOD AND SYSTEM FOR VERIFYING THE HARDWARE IMPLEMENTATION OF TCP/IP

FIELD OF THE INVENTION

This invention relates generally to TCP/IP processing and more specifically to a method and system for verifying the operation of a hardware implementation of a TCP/IP processor.

BACKGROUND OF THE INVENTION

The Transmission Control Protocol/Internet Protocol ("TCP/IP") is a combination of protocols which allows computers (or "hosts") to communicate information across one or more networks. Within TCP/IP, each protocol is assigned a specific task, and the protocols are arranged in a layered design typically referred to as a "stack", i.e., a higher level protocol uses a lower level protocol to perform its tasks. Between TCP and IP, TCP is the higher level protocol. Moreover, TCP/IP processing is typically performed in software. Although TCP and IP are two of a family of many different protocols which perform their own unique tasks, it has become traditional to refer to the whole family of protocols as TCP/IP simply because TCP and IP are the best known of these protocols.

The Internet Protocol ("IP") is the protocol that provides for an unreliable transmission of packets of 64K bytes of data called datagrams from one host to another. This protocol is unreliable because it does not care if a sent packet is lost, duplicated, or corrupted. The IP relies on higher level protocols to ensure a reliable transmission. The primary tasks of the IP are addressing, routing, and fragmentation. Another duty of the IP is to remove old packets from the network.

The IP uses the address carried in the internet header to determine the destination of data packets. Selection of the path for transmission is called routing. Routes are based upon static or dynamic tables. Fragmentation is needed when a block of data is too large to fit the network below IP. If a large block of data arrives at the IP level for transmission over the network, the IP divides the block into smaller fragments before sending them onto the network. When data fragments are received from the network, the IP reassembles the data fragments so as to correspond to the original block.

The Transfer Control Protocol ("TCP") is designed to provide a reliable connection between two hosts across different networks using the Internet Protocol. The data sent with TCP/IP is considered to be a stream of bytes, even though the data has to be split into smaller packets due to the underlying protocols. TCP must recover data that is damaged, lost, duplicated, or delivered out of order by the internet communication system. TCP also provides a way for the receiver to govern the amount of data sent by the sender, i.e., it provides flow or congestion control. Another responsibility of the TCP protocol is connection handling, wherein TCP manages a number of connections at the same time.

The unit transferred between two host machines using the TCP protocol software is called a segment. Segments are exchanged to establish connections, to transfer data, to send acknowledgments ("ACK") that data was received, to define window sizes, and to close connections. Each segment is divided into two parts, a header and data. The TCP header carries the identification and control information and contains all the necessary information to ensure safe transfer of the data, to handle flow control, and to handle connections. FIG. 1 illustrates a conventional TCP segment with the data and the elements of the header, and is described in detail below.

As seen in FIG. 1, the Source Port is a 16-bit number that identifies where the TCP segment originated from within the sending host, and the Destination Port is a 16-bit number that identifies where the TCP segment is destined in the receiving host. The Sequence Number is a 32-bit number identifying the current position of the first data byte in the segment within the entire byte stream for the TCP connection. The Acknowledgement Number is a 32-bit number identifying the next data byte the sender expects from the receiver.

HLEN is the header length, and it is a 4-bit field that specifies the total TCP header length. The field identified as Reserved is a 6-bit field currently unused and reserved for future use. Code bits are single bit flags that notify either the sending host or the receiving host that certain variables are being implemented during the TCP session. The Window is a 16-bit number used by TCP for flow control in the form of a data transmission window size, and it tells the sender how much data the receiver is willing to accept. The Checksum is preferably a 16-bit value that is computed by the TCP sending host, based on the contents of the TCP header and data fields. This 32-bit checksum will be compared by the receiver with the value the receiver generates using the same computation. If the values match, the receiver is assured that the segment arrived intact.

Where it is necessary for a TCP sender to notify the receiver of urgent data that should be processed by the receiving application as soon as possible, the Urgent Pointer is used. It is a 16-bit field that tells the receiver when the last byte of urgent data in the segment ends. In order to provide additional functionality, several optional parameters may be used between a TCP sender and receiver. Because options may vary in size, it may be necessary to "pad" the TCP header with zeroes, using the Padding field, so that the segment ends on a 32-bit word boundary as defined by the standard. Although the Data field is not used in some circumstances (e.g., ACK segments with no data in the reverse direction), this variable length field carries the application data from the TCP sender to receiver.

Local Area Networks ("LAN"), Metropolitan Area Networks ("MAN"), or Wide Area Networks ("WAN") typically use TCP/IP to transfer data from one computer to another, and Gigabit Ethernet is widely used as the physical medium in these environments. The Gigabit Ethernet, and similar technologies, enable fast transmission of the IP data once put on the wire. However, the prior art implements TCP/IP exclusively in software and is thus unable to utilize the potential increase in transfer rate through implementation of faster TCP/IP protocol processing. New devices are being developed that will implement the TCP/IP in both software and hardware. What is needed is a method and system for verifying the operation of a hardware implementation of TCP/IP.

SUMMARY OF THE INVENTION

The present invention is directed at addressing the abovementioned shortcomings, disadvantages and problems of the prior art. A preferred embodiment of the invention comprises a method for verifying the hardware operation of an Application Specific Integrated Circuit ("ASIC") chip having microcode logic for enabling Transmission Control Protocol/Internet Protocol ("TCP/IP") processing, said method performed in a system that comprises a first computing device having a processor and register transfer level (RTL) code for simulating a computing device that includes said ASIC, said system further comprising a second computing device coupled to said first computing device via a network, said second computing device comprising a processor and a TCP/IP stack for performing TCP/IP processing, said method comprising the steps of: (a) causing said RTL code to initiate a TCP/IP connection between said first computing device and said second computing device over said network, including the generation of a SYN packet addressed to said second computing device that is coupled by said first computing device to said network so as to enable said SYN packet to be received and processed by said second computing device; (b) detecting by said first computing device a SYN-ACK packet generated by said second computing device in response to its receipt of said SYN packet; and (c) causing said RTL code to process said SYN-ACK packet and to generate an ACK packet that is coupled by said first computing device to said network for receipt by said second computing device, so as to complete said RTL code initiated TCP/IP connection.

In a preferred embodiment of the present invention, said RTL code is Verilog code and at least one TCP/IP timer value in said second computing device is slowed to enable said Verilog code to respond to a packet sent by said second computing device before said second computing device times out and retransmits said packet.

In an alternative embodiment of the invention, the second computing device initiates the TCP/IP connection with said first computing device. According to this method, the first computing device would detect a SYN packet addressed to the RTL code. The RTL code upon receiving the SYN packet would process the packet to generate a SYN-ACK packet to be received by the second computing device. Finally, the first computing device would detect an ACK packet from the second computing device, so as to complete the second computing device generated TCP/IP connection. Both the RTL code initiated TCP/IP connection and the second computing device TCP/IP connection enable the transfer of at least one packet of data between said first computing device and said second computing device.

A preferred embodiment of the present invention also comprises a system for verifying the hardware operation of an ASIC chip, said system comprising a first computing device having a processor and register transfer level code for simulating a computing device that includes said ASIC and a second computing device coupled to said first computing device via a network, said second computing device including a TCP/IP stack for performing TCP/IP processing.

Where the second computing device is a Linux machine, a system according to another embodiment of the present invention further includes Middleware running on a Linux machine to facilitate the transfer of packets from the RTL code addressed to the second computing device and from the second computing device addressed to the RTL code.

An object of the present invention is to verify the operation of a hardware implementation of TCP/IP on an ASIC chip, wherein microcode logic is used for enabling TCP/IP processing. A key advantage of the present invention is that the TCP/IP processing performed by the ASIC chip is simulated in software and tested against an industry standard TCP/IP stack. That is, the software (preferably register transfer level code) and an associated processor function to simulate a computing device that includes this ASIC chip, and this simulation system is used to communicate with a remote host or server over a network that has an industry standard TCP/IP protocol stack, so as to test the operability of the ASIC hardware implementation.

BRIEF DESCRIPTION OF THE DRAWINGS

The foregoing aspects and attendant advantages of the present invention will become more readily appreciated by reference to the following detailed description when taken in conjunction with the accompanying drawings, wherein:

FIG. 1 illustrates a prior art TCP segment;

FIG. 4 illustrates a method according to the present invention, wherein Server 220 of FIG. 2 initiates a TCP/IP connection.

DETAILED DESCRIPTION OF THE INVENTION

Figure 2:
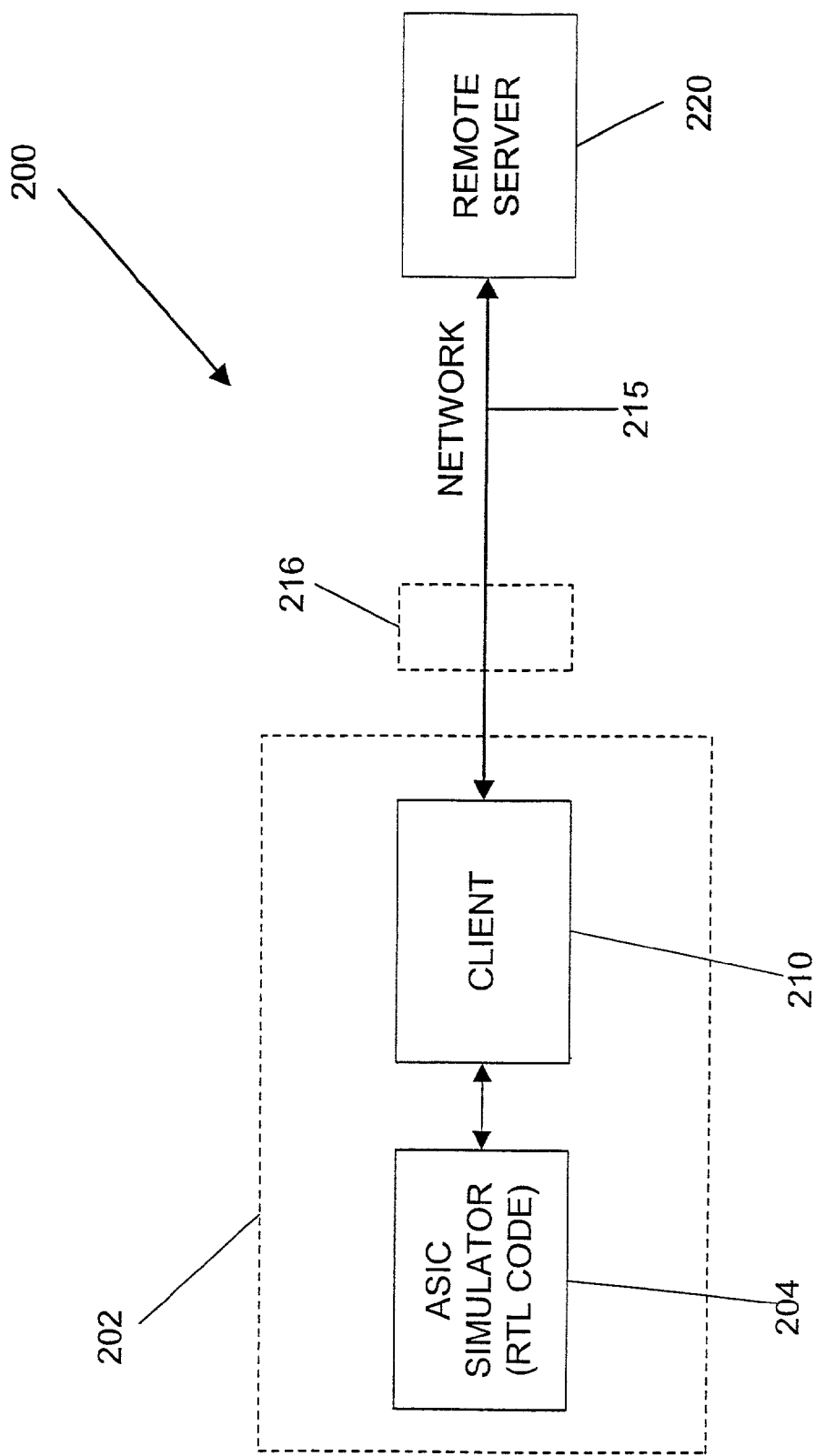
FIG. 2 is a block diagram of a preferred system according to the present invention for verifying the hardware operation of an ASIC chip having microcode logic for enabling TCP/IP processing.

FIG. 2 is a block diagram of a preferred system 200 according to the present invention for verifying the hardware operation of an ASIC chip having microcode logic for enabling Transmission Control Protocol/Internet Protocol ("TCP/IP") processing. System 200 comprises a first computing device 202 that includes an ASIC Simulator 204 that comprises RTL code (preferably Verilog code) that replicates the logic that is intended to be implemented in the ASIC chip. That is, the RTL code has the TCP/IP protocol stack implemented in it. Also included in first computing device 202 is a processor 210 ("Client"). The RTL code 204 is coupled to the Client 210 and preferably communicates with the Client 210 using Programming Language Interface (PLI) calls. Both the RTL code and processor 210 are preferably implemented and running on a Sun Microsystems workstation. The Client 210 is preferably implemented in "C" programming language. FIG. 2 further illustrates that the Client 210 in first computing device 202 is coupled via a network 215 to a second computing device, a remote server 220. Server 220 is preferably running on a remote Linux machine. Server 220 preferably performs TCP/IP processing using an industry standard TCP/IP stack implemented in the Linux kernel. Network 215 is preferably an Ethernet Local Area Network ("LAN") (the "wire"). System 200 also may include Middleware, shown in phantom in FIG. 2, that would function to take the Ethernet packets output by Client 210 and put them on the wire, and also snoop for packets for the Server 220 that are destined for the Client 210. Middleware 216 is preferably implemented on a separate Linux machine from Server 220.

To verify the hardware operation of an ASIC chip according to the present invention, the RTL or Verilog code 204 must talk to a conventional TCP/IP stack that is implemented on Server 220. Since RTL code 204 has a TCP/IP stack implemented in it, it can process conventional TCP/IP packets from Server 220 or any other machine that implements a conventional TCP/IP stack. RTL code 204 can also generate conventional TCP/IP packets destined for Server 220 or any other machine that implements a conventional TCP/IP stack. To accomplish this operation, RTL code 204 is assigned a unique IP address and a Media Access Control ("MAC") address. This MAC address is preferably a pseudo MAC interface that talks to Client 210 since the RTL code is not a physical machine but TCP state machine.

Client 210 is responsible for interfacing the RTL code 204 with Server 220. Communication between Client 210 and Server 220 is preferably through TCP/IP sockets. To perform this interfacing function, Client 210 is operative to establish a TCP/IP connection that is initiated by the RTL Code 204. Client 210 is also operative to receive at least one MAC packet from the TCP/IP stack implemented in the RTL code 204 and to send each of these MAC packet to Server 220 via the wire 215. Client 210 is further operative to look ("snoop") for any acknowledgements or other MAC packets from Server 220 that are addressed to the RTL code 204 and operates to immediately forward each said MAC packet to the RTL code 204.

Client 210 knows the MAC address that the RTL code 204 is assigned and will pass all the MAC packets addressed to the RTL code 204 (along with any broadcast packets) to the RTL code through PLI calls. Since this MAC address is unique in the LAN, no other system will pick it up. As soon as Client 210 gets a MAC packet from the TCP/IP stack in the RTL code 204, it will put it on the wire 215 for coupling to Server 220. Similarly, Client 210 will snoop for data packets from Server 220 addressed to RTL code 204, and as soon as any are detected, they are coupled to the RTL code 204.

To facilitate communication between the RTL code 204 and Server 220, the present invention preferably modifies one or more TCP/IP timers in Server 220. This is done because the RTL code 204 running on the Sun workstation is very slow in processing TCP/IP packets compared to the TCP/IP processing performed by Server 220. The following example illustrates what could occur due to this timing discrepancy between Verilog code 204 and Server 220 in processing TCP/IP packets. For instance, whenever Server 220 wants to establish a TCP/IP connection with the RTL code 204, it will send a MAC packet having a SYN (synchronize sequence numbers) control bit to Verilog code 204 and wait for a MAC packet having a SYN-ACK control bit, which is an acknowledgement that the connection can be established. However, by the time Verilog code 204 processes this SYN packet and replies with a SYN-ACK, Server 220 will time-out and retransmit the SYN packet again. This will recur multiple times. Upon failing several times to timely receive a SYN-ACK packet, Server 220 may then give up and close the connection. Modifying the timers of Server 220 overcomes this by slowing the TCP/IP processing in Server 220 to a speed that allows Verilog code 204 to respond before any of the timers in Server 220 can go off.

Figure 3:
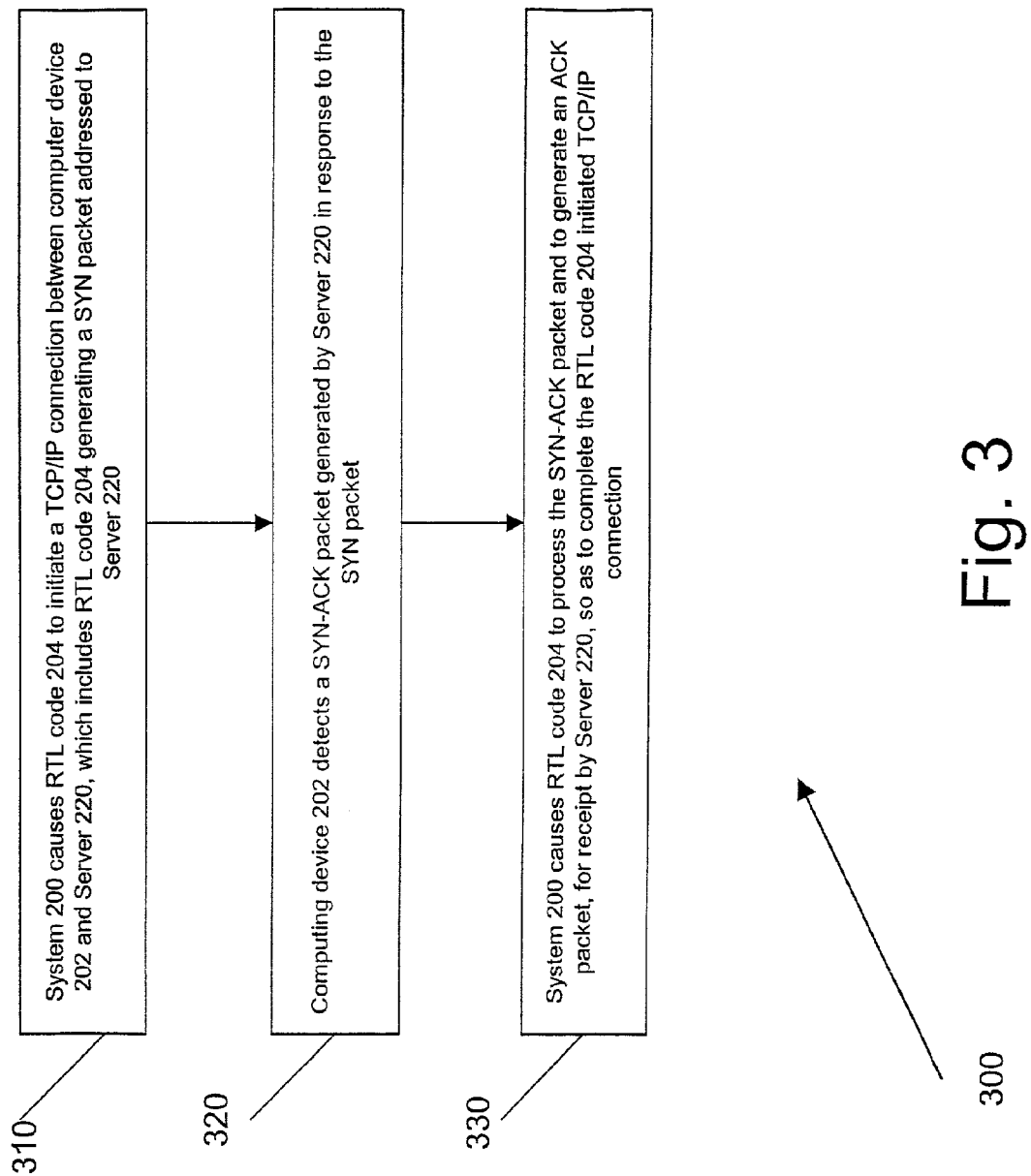
FIG. 3 illustrates a preferred embodiment of the method performed by the ASIC simulation system of FIG. 2.

FIG. 3 illustrates a method 300 performed by the system illustrated in FIG. 2 according to the present invention, for verifying hardware operation of an ASIC chip having microcode logic for enabling TCP/IP processing. Those skilled in the art will realize that method 300 could also be implemented by other systems, in accordance with the present invention. Since the purpose of the verification scheme according to the present invention is to verify an ASIC implemented in RTL or Verilog code, the present example focuses on RTL code 204 causing a TCP/IP connection to be established with Server 220. Moreover, it is assumed that computing device 202, which includes RTL code 204, is connected to a plurality of other machines on a LAN including Server 220. All machines on the LAN have ARP (Address Resolution Protocol) entries for RTL code 204 and can generate MAC packets destined for the IP address assigned to RTL code 204. Those skilled in the art will realize that RTL code 204 can communicate with machines that are not connected to the same LAN and that Server 220 could cause the TCP/IP connection to be established.

According to FIG. 3, System 200 causes RTL code 204 to initiate a TCP/IP connection between computing device 202 and Server 220, at step 310. To initiate this connection, RTL code 204 will generate a SYN packet addressed to Server 220 and give it to Client 210, which puts this MAC packet over the Ethernet. A Network Interface Card ("NIC") of Server 220 picks up this packet addressed to Server 220 and passes it to the TCP/IP stack in Server 220. After processing the packet, Server 220 will respond with a SYN-ACK. Since the MAC packet containing this SYN-ACK has the destination MAC address of RTL code 204, Client 210, which is snooping for such packets, will detect it and pass it to RTL code 204, at step 320. Finally, at step 330, System 200 will cause RTL code 204 to process the SYN-ACK packet and to generate an ACK packet that is coupled by computing device 202 to the Ethernet for receipt by Server 220, so as to complete the RTL code 204 initiated TCP/IP connection.

Once the above TCP/IP connection has been established, RTL code 204 can talk to Server 220 according to a conventional TCP/IP session, during which at least one MAC data packet can be transferred between computing device 202 and Server 220. RTL code 204 may, for example, write some data to Server 220. To do this, RTL code 204 will first prepare at least one MAC packet that includes a stream of data bit and give it to Client 210 to be placed on the wire. When Server 220 responds with an ACK, Client 210 picks it up and gives it back to RTL code 204 for processing. In this way, Client 210 is considered as a pseudo NIC for RTL code 204. From the viewpoint of RTL code 204, Client 210 functions as a device driver for the NIC interfacing with it. In a similar manner, Server 220 may write data to RTL code 204.

Server 220 can also initiate a TCP/IP session with RTL code 204. FIG. 4 illustrates a method 400 according to the present invention, wherein Server 220 of FIG. 2 initiates a TCP/IP connection. According to FIG. 4, System 200 causes computing device 202 to detect a SYN packet from Server 220 addressed to RTL code 204, thereby recognizing that Server 220 has initiated a TCP/IP connection between computing device 202 and Server 220. Client 210, which is snooping for such packets, will detect the SYN packet and pass it to RTL code 204, at step 410. RTL code 204 will then process the SYN packet to generate a SYN-ACK packet that Client 210 puts on the wire to Server 220, at step 420. Finally, at step 430, computing device 202 detects an ACK packet generated by Server 220 in response to receipt of the SYN-ACK packet, so as to complete the Server 220 initiated TCP/IP connection. After the TCP/IP connection is established, a conversation between RTL code 204 and Server 220 could take place in much the same way as described above.

The method and system for testing the hardware implementation of TCP/IP described in the text above was chosen as being illustrative of the best mode of the present invention. The embodiment of the present invention described above is illustrative of the principles of the invention and is not intended to limit the invention to the particular embodiment described. Accordingly, while the preferred embodiment of the invention has been illustrated and described, it will be appreciated that various changes can be made therein without departing from the spirit and scope of the invention.

What is claimed is:

1. A method for verifying the hardware operation of an Application Specific Integrated Circuit ("ASIC") chip having microcode logic for enabling Transmission Control Protocol/Internet Protocol ("TCP/IP") processing, said method performed in a system that comprises a first computing device having a processor and register transfer level (RTL) code for simulating a computing device that includes said ASIC, said system further comprising a second computing device coupled to said first computing device via a network, said second computing device comprising a processor and a TCP/IP stack for performing TCP/IP processing, said method comprising the steps of:

(a) causing said RTL code to initiate a TCP/IP connection between said first computing device and said second computing device over said network, including the generation of a SYN packet addressed to said second computing device that is coupled by said first computing device to said network so as to enable said SYN packet to be received and processed by said second computing device;

(b) detecting by said first computing device a SYN-ACK packet generated by said second computing device in response to its receipt of said SYN packet; and (c) causing said RTL code to process said SYN-ACK packet and to generate an ACK packet that is coupled by said first computing device to said network for receipt by said second computing device, so as to complete said RTL code initiated TCP/IP connection, whereby a first TCP/IP timer is deliberately slowed relative to a second TCP/IP timer that would have been employed if said RTL code is not employed to generate said ACK packet, said first TCP/IP timer being slowed in order to prevent said second computing device from retransmitting said SYN-ACK packet due to a time-out event.

2. The method of claim 1 further comprising the steps of:

(d) causing said first computing device to detect on said network a SYN packet addressed to said RTL code, thereby recognizing that said second computing device has initiated a TCP/IP connection between said first computing device and said second computing device over said network, and for coupling said SYN packet to said RTL code;

(e) processing said SYN packet by said RTL code, and causing said RTL code to generate a SYN-ACK packet that is coupled by said first computing device to the network so as to enable said SYN-ACK packet to be received by said second computing device; and (f) detecting by said first computing device an ACK packet generated by said second computing device in response to its receipt of said SYN-ACK packet, so as to complete said second computing device initiated TCP/IP connection.

3. The method of claim 1 wherein said RTL initiated TCP/IP connection enables the transfer of at least one packet of data between said first computing device and said second computing device.

4. A system for verifying the hardware operation of an Application Specific Integrated Circuit ("ASIC") chip having microcode logic for enabling Transmission Control Protocol/Internet Protocol ("TCP/IP") processing, said system comprising:

a first computing device having a processor and register transfer level (RTL) code for simulating a computing device that includes said ASIC; and a second computing device coupled to said first computing device via a network, said second computing device comprising a processor and a TCP/IP stack for performing TCP/IP processing, wherein: said RTL code is designed to initiate a TCP/IP connection between said first computing device and said second computing device over said network, including the generation of a SYN packet addressed to said second computing device that is coupled by said first computing device to said network so as to enable said SYN packet to be received and processed by said second computing device; said first computing device is operative to detect a SYN-ACK packet generated by said second computing device in response to its receipt of said SYN packet; and said RTL code is designed to process said SYN-ACK packet and to generate an ACK packet that is coupled by said first computing device to said network for receipt by said second computing device, so as to complete said RTL code initiated TCP/IP connection, whereby a first TCP/IP timer is deliberately slowed relative to a second TCP/IP timer that would have been employed if said RTL code is not employed to generate said ACK packet, said first TCP/IP timer being slowed in order to prevent said second computing device from retransmitting said SYN-ACK packet due to a time-out event.

5. The system of claim 4, wherein: said first computing device is further operative to detect on said network a SYN packet addressed to said RTL code, thereby recognizing that said second computing device has initiated a TCP/IP connection between said first computing device and said second computing device over said network, and for coupling said SYN packet to said RTL code; said RTL code is further designed to process said SYN packet to generate a SYN-ACK packet that is coupled by said first computing device to the network so as to enable said SYN-ACK packet to be received by said second computing device; and said first computing device is further operative to detect an ACK packet generated by said second computing device in response to its receipt of said SYN-ACK packet, so as to complete said second computing device initiated TCP/IP connection.

6. The system of claim 4 wherein said first computing device and said second computing device are connected via one or more Local Area Networks.

7. The system of claim 4 wherein said RTL code is Verilog code.

8. The system of claim 4 wherein said first computing device is a Sun workstation and said second computing device is a Linux machine, and said system further comprised a third computing device that is a Linux machine, said third computing device coupled between said first and second computing devices, wherein said third computing device is operative to receive at least one packet from said first computing device addressed from said RTL code to said second computing device and to place each said packet on the network, said third computing device is further operative to look for at least one packet from said second computing device addressed to said RTL code and to forward each said packet to said first computing device.

* * * * *